United States Patent

Wallquist et al.

[11] Patent Number: 6,066,202
[45] Date of Patent: May 23, 2000

[54] DIKETOPYRROLOPYRROLE COMPOSITIONS

[75] Inventors: Olof Wallquist, Marly; Ingo Schlöder, Matran, both of Switzerland

[73] Assignee: Ciba Specialty Chemicals Corporation, Tarrytown, N.Y.

[21] Appl. No.: 09/072,906

[22] Filed: May 5, 1998

[30] Foreign Application Priority Data

May 6, 1997 [CH] Switzerland .................... 1054/97

[51] Int. Cl.⁷ .................................. C08K 5/34
[52] U.S. Cl. ................ 106/494; 106/493; 106/498; 548/453
[58] Field of Search .................. 106/493, 498, 106/494; 548/453

[56] References Cited

U.S. PATENT DOCUMENTS

| | | | |
|---|---|---|---|
| 4,579,949 | 4/1986 | Rochat et al. ............ | 546/167 |
| 4,720,305 | 1/1988 | Iqbal et al. .............. | 106/288 |
| 4,778,899 | 10/1988 | Plenninger et al. ........ | 548/453 |
| 4,783,540 | 11/1988 | Babler .................. | 548/453 |
| 4,791,204 | 12/1988 | Jost et al. .............. | 546/101 |
| 5,169,953 | 12/1992 | Mizuguchi et al. ........ | 544/144 |
| 5,200,528 | 4/1993 | Wooden et al. .......... | 548/453 |
| 5,342,955 | 8/1994 | Wooden et al. .......... | 548/255 |
| 5,378,276 | 1/1995 | Chassot et al. ........... | 106/498 |
| 5,389,141 | 2/1995 | Chassot ................. | 106/498 |
| 5,476,949 | 12/1995 | Wallquist et al. ......... | 548/453 |
| 5,646,299 | 7/1997 | Hao et al. ............... | 548/453 |
| 5,693,824 | 12/1997 | Mizuguchi et al. ........ | 548/453 |
| 5,708,188 | 1/1998 | Hao et al. ............... | 548/453 |
| 5,738,719 | 4/1998 | Wallquist et al. ......... | 106/498 |
| 5,756,746 | 5/1998 | Hao et al. ............... | 546/56 |
| 5,808,094 | 9/1998 | Mizuguchi et al. ........ | 548/453 |
| 5,821,373 | 10/1998 | Hao et al. ............... | 106/498 |
| 5,871,575 | 2/1999 | Ruch et al. .............. | 106/498 |
| 5,919,945 | 7/1999 | Hendi .................... | 548/453 |

FOREIGN PATENT DOCUMENTS

| | | |
|---|---|---|
| 2128265 | 1/1995 | Canada . |
| 3-026767 | 5/1991 | Japan . |
| 2238550 | 6/1991 | United Kingdom . |

OTHER PUBLICATIONS

Derwent Abst. 91–078500/11, Abstract of Japanese Patent Specification No. 03–026767 (Jun. 1989).
Ann. vol. 260, pp. 137–160 (1989) No Month.

*Primary Examiner*—Anthony Green
*Attorney, Agent, or Firm*—Kevin T. Mansfield; David R. Crichton

[57] ABSTRACT

Substance compositions, which comprise at least one diketopyrrolopyrrole from each of formulae

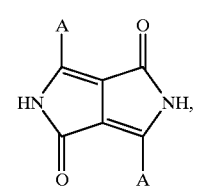 (I)

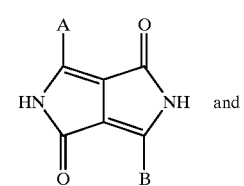

(II)

and

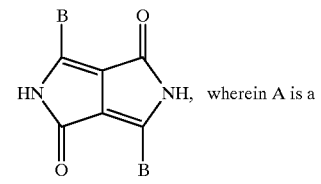 (III)

wherein A is a

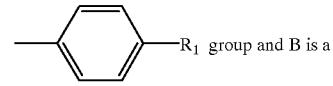 $R_1$ group and B is a

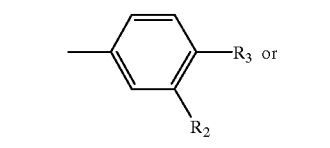 $R_3$ or

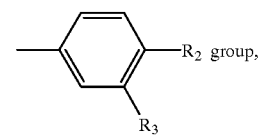 $R_2$ group, $R_1$ is $C_1$–$C_6$alkyl, $C_1$–$C_6$alkoxy, $C_1$–$C_6$alkylthio, halogen or phenyl,
$R_2$ is a COX group, wherein
X is $NR_4R_5$ or a heterocyclic radical containing at least 2 N atoms, one of which N atoms forms an amide with the carbonyl group,
$R_3$ is hydrogen, halogen or $C_1$–$C_6$alkyl, Admixture of such a substance composition to diketopyrrolopyrrole pigments improves the rheological behaviour of the latter as well as the gloss of the colorations produced therewith to an unexpected degree.

9 Claims, No Drawings

DIKETOPYRROLOPYRROLE COMPOSITIONS

The present invention relates to substance compositions consisting of diketopyrrolopyrroles substituted by carbonamide groups and to their use for improving the gloss and rheology of diketopyrrolopyrrole pigments.

JP-A 91-26767 describes diketopyrrolopyrroles having substituents containing 1 to 4 amino groups, including among many others also the compound of formula

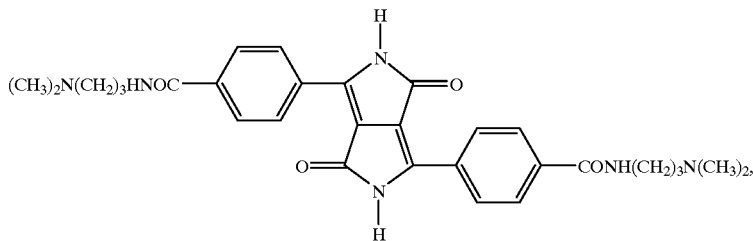

and their use as dispersants for pigments. Such compounds provide the pigments with good rheological behaviour and the colorations obtained therewith with a beautiful gloss.

It has now been found that these properties can, very surprisingly, be improved by using substance compositions consisting of 3 different diketodiphenylpyrrolopyrroles, 2 of which—one in asymmetrical and the other in symmetrical arrangement—carry one or two carbonamide groups in p-position or, preferably, in m-position of the phenyl.

Accordingly, this invention relates to substance compositions, which comprise at least 3 diketopyrrolopyrroles of formulae

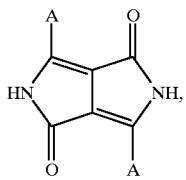

(I)

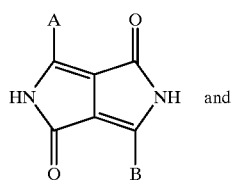

(II)

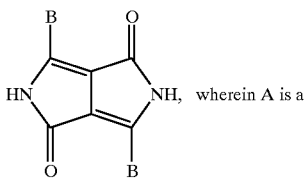

(III)

wherein A is a

—⌬—$R_1$ group and B is a

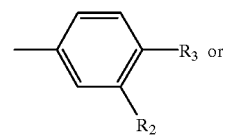

—⌬—$R_3$ or $R_2$

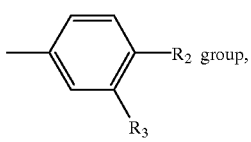

—⌬—$R_2$ group, $R_3$ $R_1$ is $C_1$–$C_6$alkyl, $C_1$–$C_6$alkoxy, $C_1$–$C_6$alkylthio, halogen or phenyl, $R_2$ is a COX group, wherein X is $NR_4R_5$ or a heterocyclic radical containing at least 2 N atoms, one of which N atoms forms an amide with the carbonyl group, $R_3$ is hydrogen, halogen or $C_1$–$C_6$alkyl, $R_4$ is hydrogen, a —$(CH_2)_m$—$CH_3$ group, or $R_5$ and $R_5$ are a —$(CH_2)_n$—$N(R_6)_2$,

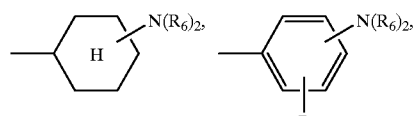

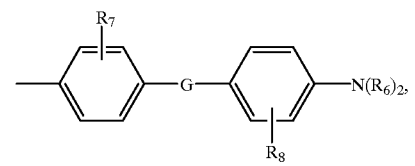

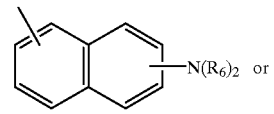 or

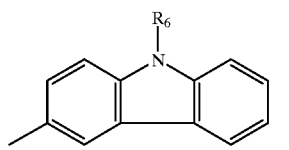

group,

G may be a direct bond, —CH$_2$—, —CH(CH$_3$)—, —C(CH$_3$)$_2$—, —CH=N—, —N=N—, —O—, —S—, —SO—, —SO$_2$— or —NR$_9$—, R$_6$ is C$_1$–C$_6$alkyl, R$_7$ and R$_8$ are each independently of the other hydrogen, halogen, C$_1$–C$_6$alkyl, R$_9$ is hydrogen or methyl, m is zero or a number from 1 to 17, and n is a number from 2 to 6.

Any substituents defined as C$_1$–C$_6$alkyl are unbranched C$_1$–C$_6$alkyl, for example methyl, ethyl, n-propyl, n-butyl, n-pentyl or n-hexyl, or branched C$_1$–C$_6$alkyl, for example isopropyl, n-butyl, sec-butyl, tert-butyl, sec-amyl or tert-amyl.

Where R$_1$ is defined as C$_1$–C$_6$alkoxy and C$_1$–C$_6$alkylthio, alkyl has the same meaning as that given above for C$_1$–C$_6$alkyl.

R$_1$, R$_3$, R$_7$ and R$_8$ defined as halogen are typically iodo, bromo or, preferably, chloro.

X defined as a heterocyclic radical containing at least 2 N atoms is, for example, a heterocyle of formula

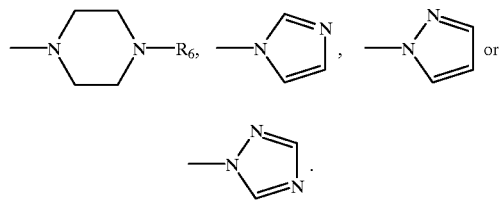

B is preferably a 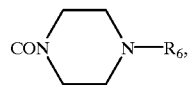 group.

Particularly interesting substance compositions according to the above definitions are those, wherein R$_1$ is methyl, branched C$_1$–C$_6$alkyl, phenyl, halogen R$_2$ is CONR$_5$R$_6$ or

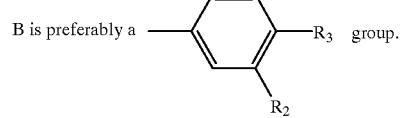

R$_3$ and R$_4$ are hydrogen,

R$_5$ is a —(CH$_2$)$_n$—N(CH$_3$)$_2$ or

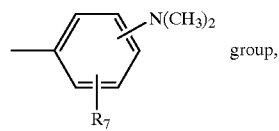 group,

R$_7$ is hydrogen or methyl, and n is a number from 2 to 6.

Preferred substance compositions of the above definition are those, wherein

R$_1$ is methyl, tert-butyl, phenyl or chloro,

R$_5$ is a —(CH$_2$)$_n$—N(CH$_3$)$_2$ group, and n is 2 or 3.

The substance compositions of this invention are prepared in analogy to the commonly known method of preparation for diketopyrrolopyrroles, such as it is described in U.S. Pat. No. 4,579,949, namely by synthesis in situ, wherein e.g. 1 mol of a disuccinate is reacted with 2 mol of a mixture consisting of at least two nitriles of formulae

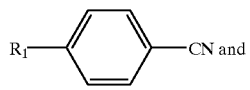 (IV)

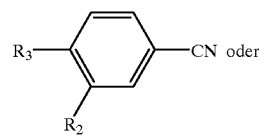 (V)

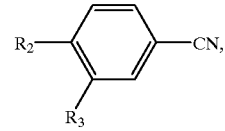 (VI)

wherein R$_1$, R$_2$ and R$_3$ have the meanings given above. The two nitriles of formulae IV and V or VI are conveniently used in a molar ratio of 1:4 to 4:1 to each other.

The nitriles of formulae IV, V and VI are known compounds. Any of them which are still novel can be prepared in analogy to commonly known processes.

As already mentioned it has been found that the admixture of a smaller proportion of a novel substance composition of the above definition to a diketopyrrolopyrrole pigment results in a very surprising improvement of the rheological behaviour of the latter and of the gloss of the colorations obtained therewith. The rheological behaviour of transparent diketopyrrolopyrrole pigments is improved in particular. In addition, the novel substance compositions do not change the shade of the diketopyrrolopyrrole pigment, or at most only to a very minor degree.

It has furthermore been found that admixing diketopyrrolopyrroles of formula II, having the definitions and preferred meanings given above, by themselves to a diketopyrrole pigment also effects an unexpected improvement of the rheological behaviour and gloss.

The diketopyrrolopyrroles of formula II can be prepared, inter alia, by the method described in U.S. Pat. No. 4,778,899.

This invention therefore also relates to pigment compositions, which comprise a) 80–99.9% by weight of at least one 1,4-diketopyrrolo[3,4-c]pyrrole pigment, in particular one of formula

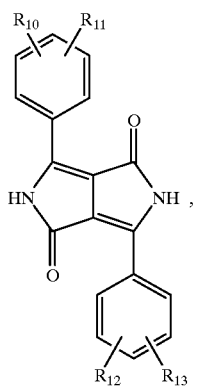

(VII)

wherein $R_{10}$, $R_{11}$, $R_{12}$ and $R_{13}$ are each independently of one another hydrogen, Cl, Br, $CH_3$, $OCH_3$, $CO_2R_6$ $C(CH_3)_3$, CN or phenyl, and b) 0.1–20% by weight of a substance composition comprising 3 diketopyrrolopyrroles of formulae I, II and III or a diketopyrrolopyrrole of formula II of the above definition.

Component b) is preferably a composition comprising 3 diketopyrrolopyrroles of formulae I, II and III of the above definition.

Preferred 1,4-diketopyrrolo[3,4-c]pyrroles of formula VII are those, wherein $R_{10}$ and $R_{12}$ are each independently of the other Cl, $CH_3$, $C(CH_3)_3$, CN or phenyl, and $R_{11}$ and $R_{13}$ are hydrogen.

Preferred pigment compositions are those comprising 1,4diketopyrrolo[3,4-c]pyrroles of formula VII and a substance composition comprising 3 diketopyrrolopyrroles of formulae I, II and III, wherein $R_{11}$ and $R_{13}$ are hydrogen, and $R_{10}$, $R_{12}$ and $R_1$ are identical and are preferably methyl, tert-butyl, tert-amyl, phenyl or chloro.

The 1,4-diketopyrrolopyrroles of formula VII are known compounds.

The two components a) and b) are blended by any commonly known methods. Component b) can be admixed to component a) e.g. as moist press cake or in the form of a powder during the synthesis, recrystallisation or filtration of said component a). Components a) and b) can also be blended by vigorous mixing or grinding or they can be added to the high molecular weight organic material to be coloured and be blended during the dispersion process.

The novel pigment compositions can be used as pigments for colouring high molecular weight organic material.

High molecular weight organic materials which can be coloured or pigmented with the novel pigment compositions are, for example, cellulose ethers and esters, such as ethylcellulose, nitrocellulose, cellulose acetate, cellulose butyrate, natural resins or synthetic resins, such as polymerisation or condensation resins, for example aminoplasts, in particular urea/formaldehyde and melamine/formaldehyde resins, alkyl resins, phenolic plastics, polycarbonates, polyolefins, polystyrene, polyvinyl chloride, polytetrafuoroethylene, polyamides, polyurethanes, polyesters, polyether ketones, polyphenylene oxides, rubber, casein, silicone and silicone resins, singly or in mixtures.

The cited high molecular weight organic compounds can be obtained singly or in mixtures as plastic compositions, melts or in the form of spinning solutions, paints, coatings or printing inks. Depending on the envisaged end use, it is advantageous to use the novel pigment compositions as toners or in the form of preparations. The novel pigment compositions can be used in an amount of 0.01 to 30% by weight, preferably of 0.1 to 10% by weight, based on the high molecular weight material to be pigmented.

For pigmenting paints and printing inks, the high molecular weight organic materials and the novel pigment compositions, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved and thereafter all the components are mixed.

The colorations so obtained, e.g. in plastic materials, fibres, paints or prints, are distinguished by good allround fastness properties, good dispersibility, good fastness to re-coating, migration, heat, light and weathering as well as by low viscosity and good gloss.

In comparison to the unmodified base pigments, the novel pigment compositions additionally have improved properties as regards their performance in use, such as improved rheology and storage stability, less separation effects such as pigment flushing when used together with e.g. white pigments, and less tendency to flocculate. Owing to the good rheological properties of these compositions it is also possible to prepare coatings and paints of high concentration (so-called high loadings). High gloss is additionally obtained at the same time. The admixture of the novel pigment compositions does not change the shade, or only to a very minor degree. The novel pigment compositions are therefore suitable preferably for colouring printing inks and paints, in particular for metallic effect finishes.

The invention is illustrated by the following Examples.

EXAMPLE 1

A suffonation flask is charged under nitrogen with 9.2 g of sodium in a mixture consisting of 50 ml of dry t-amyl alcohol and 140 ml of dry xylene, and this mixture is stirred at 150° C. until the sodium is completely reacted. 18.5 g of 3-cyano(3-dimethylaminopropyl)benzamide and 12.74 g of 4-t-butylbenzonitrile are then added. Subsequently, a solution of 23.95 g of di-t-butyl succinate in 60 ml of xylene is slowly added dropwise at 120° C. The reaction mixture is stirred for 2 hours at reflux and is then cooled to 50° C. and added to a mixture consisting of 670 ml of water and 24.6 g of acetic acid. The sulfonation flask is flushed with 160 ml of methanol and the mixture is then distilled with water vapour, stirred for 18 hours at room temperature and filtered. The residue is washed first with a large amount of water, then with a small amount of a water/methanol mixture 1:1 and is then dried overnight in a vacuum drying oven at 80° C. Yield: 24.75 g (65%) of an orange powder.

| | Analysis | | |
|---|---|---|---|
| | C | H | N |
| found | 72.07 | 7.12 | 8.75 |
| calc. | 72.00 | 7.18 | 8.69 |

EXAMPLE 2

A sulfonation flask is charged under nitrogen with 1.15 g of sodium in a mixture consisting of 7 ml of dry t-amyl alcohol and 13 ml of dry xylene, and this mixture is stirred at 150° C. until the sodium is completely reacted. The resulting solution is then charged with 2.31 g of 3-cyano-(3-dimethylaminopropyl)benzamide and 1.37 g of 4-chlorobenzonitrile at 90° C. Subsequently a solution of 3.07 g of di-t-butyl succinate in 10 ml of xylene is slowly added dropwise at 120° C. The reaction mixture is stirred for 2 hours at reflux and is then cooled to 60° C. and added to a mixture consisting of 85 ml of water and 3.06 g of acetic acid. The sulfonation flask is flushed with 25 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C., giving 2.32 g of a red powder.

| | Analysis | | | |
|---|---|---|---|---|
| | C | H | N | Cl |
| found | 61.69 | 4.33 | 9.50 | 11.98% |
| calc. | 63.93 | 5.14 | 12.42 | 7.86% |

EXAMPLE 3

A sulfonation flask is charged under nitrogen with 1.15 g of sodium in a mixture consisting of 7 ml of dry t-amyl alcohol and 13 ml of dry xylene, and this mixture is stirred at 150° C. until the sodium is completely reacted. The resulting solution is then charged with 2.31 g of 3-cyano-(3-dimethylaminopropyl)benzamide and 1.79 g of 4-biphenylnitrile at 90° C. Subsequently, a solution of 3.07 g of di-t-butyl succinate in 10 ml of xylene is slowly added dropwise at 120° C. The reaction mixture is stirred for 2 hours at reflux and is then cooled to 60° C. and added to a mixture consisting of 85 ml of water and 3.06 g of acetic acid. The sulfonation flask is flushed with 25 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C., giving 2.5 g of a red powder.

| | Analysis | | |
|---|---|---|---|
| | C | H | N |
| found | 74.13 | 5.36 | 8.47% |
| calc. | 73.15 | 5.73 | 11.37% |

EXAMPLE 4

A sulfonation flask is charged under nitrogen with 1.15 g of sodium in a mixture consisting of 7 ml of dry t-amyl alcohol and 13 ml of dry xylene, and this mixture is stirred at 150° C. until the sodium is completely reacted. The resulting solution is then charged with 2.31 g of 3-cyano-(3-dimethylaminopropyl)benzamide and 1.17 g of 4-toluonitrile at 90° C. Subsequently, a solution of 3.07 g of di-t-butyl succinate in 10 ml of xylene is slowly added dropwise at 120° C. The reaction mixture is stirred for 2 hours at reflux and is then cooled to 60° C. and added to a mixture consisting of 85 ml of water and 3.06 g of acetic acid. The sulfonation flask is flushed with 25 ml of methanol and the mixture is distilled with water vapour, stirred for 18 hours at room temperature and filtered. The residue is washed first with a large amount of water, then with a small amount of a water/methanol mixture 1:1 and is then dried in a vacuum drying oven at 80° C., giving 1.23 g of a red powder.

| | Analysis | | |
|---|---|---|---|
| | C | H | N |
| found | 67.43 | 6.08 | 10.49% |
| calc. | 69.75 | 6.09 | 13.01% |

EXAMPLE 5

(as Example 1)

A sulfonation flask is charged under nitrogen with 1.15 g of sodium in a mixture consisting of 7 ml of dry t-amyl alcohol and 13 ml of dry xylene, and this mixture is stirred at 150° C. until the sodium is completely reacted. The resulting solution is then charged with 2.31 g of 3-cyano-(3-dimethylaminopropyl)benzamide and 1.33 g of 4-methoxybenzonitrile at 90° C. Subsequently, a solution of 3.07 g of di-t-butyl succinate in 10 ml of xylene is slowly added dropwise at 120° C. The reaction mixture is stirred for 2 hours at reflux and is then cooled to 60° C. and added to a mixture consisting of 85 ml of water and 3.06 g of acetic acid. The sulfonation flask is flushed with 25 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C, giving 0.71 g of a red powder.

| | Analysis | | |
|---|---|---|---|
| | C | H | N |
| found | 65.12 | 5.61 | 8.83% |
| calc. | 67.25 | 5.87 | 12.55% |

EXAMPLE 6

A sulfonation flask is charged under nitrogen with 30 ml of tert-amyl alcohol. After adding 0.76 g of sodium, the mixture is heated to 92–102° C. With vigorous stirring, the melted sodium is kept overnight at 100–107° C. The resultant solution is charged at 100° C. with 2.77 g of 3-cyano (3-dimethylaminopropyl)benzamide and then, over 2 hours, with 3.16 g of the pyrrolinone of formula (X)

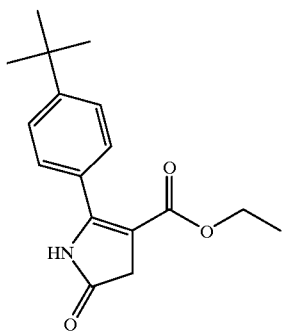

(X)

in portions [prepared according to Ann. 260, p. 137 (1890)]. The reaction mixture is stirred for 3 hours at reflux and is then cooled to 60° C. and added to a mixture consisting of 25 ml of water and 25 ml of methanol. This mixture is stirred for 4 hours at 70° C. and is then cooled to room temperature and filtered. The residue is washed with water and methanol until the filtrate is colourless and is then dried in a vacuum drying oven at 80° C., giving 1.1 g of an orange powder.

| | Analysis | | |
|---|---|---|---|
| | C | H | N |
| found | 70.54 | 7.01 | 11.82 |
| calc. | 71.16 | 6.82 | 11.86 |

EXAMPLE 7

A sulfonation flask is charged under nitrogen with 4.60 g of sodium in a mixture consisting of 25 ml of dry t-amyl alcohol and 90 ml of dry xylene, and this mixture is stirred at 150° C. until the sodium is completely reacted. The resulting solution is then charged with 9.25 g of 3-cyano(3-dimethylaminopropyl)benzamide and 4.73 g of 3-toluonitrile at 90° C. Subsequently, a solution of 11.98 g of di-t-butyl succinate in 30 ml of xylene is slowly added dropwise at 120° C. The reaction mixture is stirred for 2 hours at reflux and is then cooled to 50° C. and added to a mixture consisting of 325 ml of water and 12.31 g of acetic acid. The sulfonation flask is flushed with 70 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C., giving 13.4 g of a red powder.

| | Analysis | | |
|---|---|---|---|
| | C | H | N |
| found | 69.59 | 6.44 | 11.01% |
| calc. | 69.75 | 6.09 | 13.01% |

EXAMPLE 8

A sulfonation flask is charged under nitrogen with 3.68 g of sodium in a mixture consisting of 20 ml of dry t-amyl alcohol and 56 ml of dry xylene, and this mixture is stirred at 150° C. until -the sodium is completely reacted. The resulting solution is then charged with 7.40 g of 3-cyano(3-dimethylaminopropyl)benzamide and 4.10 g of isophthalic acid dinitrile at 90° C. Subsequently, a solution of 9.58 g of di-t-butyl succinate in 24 ml of xylene is slowly added dropwise at 120° C. The reaction mixture is stirred for 2 hours at reflux and is then cooled to 50° C. and added to a mixture consisting of 270 ml of water and 9.85 g of acetic acid. The sulfonation flask is flushed with 60 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C., giving 12.2 g of a red powder.

| | Analysis | | |
|---|---|---|---|
| | C | H | N |
| found | 66.60 | 5.78 | 13.45% |
| calc. | 68.01 | 5.25 | 15.86% |

EXAMPLE 9

A sulfonation flask is charged under nitrogen with 4.60 g of sodium in a mixture of 25 ml of dry t-amyl alcohol and 90 ml of dry xylene, and this mixture is stirred at 150° C. until the sodium is completely reacted. The resultant solution is then charged with 7.40 g of 3-cyano-(3-dimethylaminopropyl)benzamide and 5.50 g of 3,4-dichlorobenzonitrile at 90° C. Subsequently, a solution of 11.98 g of di-t-butyl succinate in 30 ml of xylene is slowly added dropwise at 120° C. The reaction mixture is stirred for 2 hours at reflux and is then cooled to 50° C. and added to a mixture consisting of 325 ml of water and 12.31 g of acetic acid. The sulfonation flask is flushed with 70 ml of methanol and the mixture is then distilled with water vapour, stirred for 18 hours at room temperature and filtered. The residue is washed first with a large amount of water, then with a small amount of a water/methanol mixture 1:1 and is then dried in a vacuum drying oven at 80° C., giving 10.5 g of a red powder.

| | Analysis | | |
|---|---|---|---|
| | C | H | N |
| found | 58.88 | 4.59 | 8.37% |
| calc. | 59.39 | 4.57 | 11.54% |

EXAMPLE 10

Preparation of a pigment composition 45.5 g of a press cake (34.1%) of a pigment mixture consisting of 1,4diketo-3,6-diphenylpyrrolo[3,4-c]pyrrole, 1,4-diketo-3-phenyl-6-(4-chlorophenyl)-pyrrolo[3,4-c] pyrrole and 1,4-diketo-3,6-di(4-chlorophenyl)-pyrrolo[3,4-c]pyrrole, prepared according to Example 1, U.S. Pat. No. 5,476,949, are stirred in 450 ml of water for 1 hour at room temperature and are then allowed to stand for 18 hours (=suspension 1). At the same time, 0.989 g of the substance of Example 1 is stirred in 30 ml of methanol for 1 hour at room temperature and this mixture is charged with 30 ml of water and is also allowed to stand for 18 hours (=suspension 2). Both suspensions are stirred individually for another hour at room temperature. Subsequently, suspension 2 is poured to suspension 1. The residue is rinsed with some water and is thoroughly mixed for 2 minutes with an Ultraturrax at 13500 to 20500 rpm. Foaming is counteracted by adding some 1,6 hexanediol. The suspension is stirred for 4 hours at room temperature, filtered, washed with water and dried in a vacuum drying oven at 80° C., giving 16.1 g of an orange-red powder.

EXAMPLE 11

The procedure of Example 10 is repeated, but replacing the pigment mixture of Example 10 with 36.3 g of a press cake (2.7%) of 1,4diketo-3,6-di(4-biphenyl)pyrrolo[3,4-c] pyrrole, prepared according to Example 19, U.S. Pat. No. 4,579,949, giving 16.0 g of a dark red substance.

EXAMPLE 12

The procedure of Example 10 is repeated, but replacing the pigment mixture of Example 10 with 50.1 g of a press cake (30.9%) of 1,4diketo-3,6-di(4-chlorophenyl)pyrrolo[3,4-c]pyrrole, prepared according to Example 6, U.S. Pat. No. 4,579,949, gwing 16.5 g of a red substance.

EXAMPLE 13

Preparation of a composition comprising high molecular weight organic material and pigment mixtures of Example 10:

5.0 g of the pigment mixture of Example 10, 200 g of glass beads (Ø=2 mm), 28.5 g of CAB-solution consisting of 41.0 g of cellulose acetobutyrate ®CAB 531.1, 20% in butanol/xylene 2:1 (Eastman Chem.), 1.5 g of zirconium octoate, 18.5 g of ®SOLVESSO 150 (ESSO)

21.5 g of butylacetate, and 17.5 g of xylene, 38.0 g of polyester resin ®DYNAPOL H700 (Dynamit Nobel) and 28.5 g of melamine resin MAPRENAL MF650 (Hoechst) are dispersed together in a disperser for 360 minutes. The flow behaviour of the paint so obtained is determined using a viscosimeter Mettler RM 180 (25° C.). The paint is distinguished by excellent rheological properties.

What is claimed is:

1. A substance composition, which comprises at least one diketopyrrolopyrrole, from each of formulae

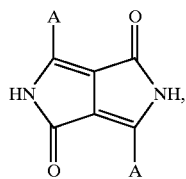
(I)

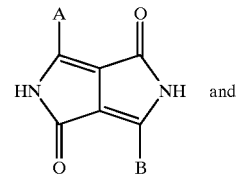
(II)

and

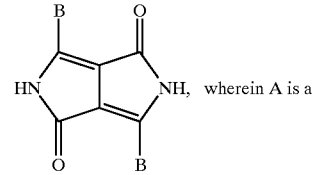
(III)

wherein A is a

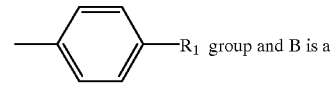
$R_1$ group and B is a

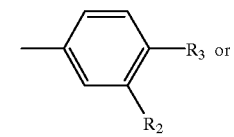
$R_3$ or

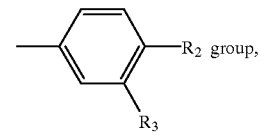
$R_2$ group, $R_1$ is $C_1$–$C_6$alkyl, $C_1$–$C_6$alkoxy, $C_1$–$C_6$alkylthio, halogen or phenyl, $R_2$ is a carbonyl containing group represented by the formula COX group, wherein X is $NR_4R_5$ or a heterocyclic radical containing at least 2 N atoms, one of which N atoms forms an amide with the carbonyl group, $R_3$ is hydrogen, halogen or $C_1$–$C_6$alkyl, $R_4$ is hydrogen, a —$(CH_2)_m$—$CH_3$ group, or $R_5$ and $R_5$ is a —$(CH_2)_n$—$N(R_6)_2$,

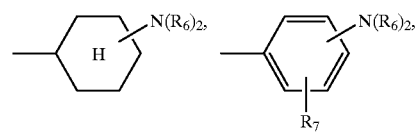

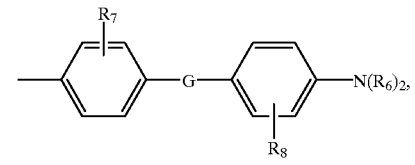

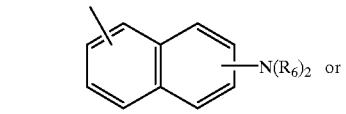
$N(R_6)_2$ or

-continued

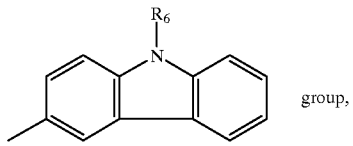
group,

G may be a direct bond, —CH$_2$—, —CH(CH$_3$)—, —C(CH$_3$)$_2$—, —CH=N—, —N=N—, —O—, —S—, —SO—, —SO$_2$— or —NR$_9$—, R$_6$ is C$_1$–C$_6$alkyl, R$_7$ and R$_8$ are each, independently of the other, hydrogen, halogen, C$_1$–C$_6$alkyl, R$_9$ is hydrogen or methyl, m is zero or a number from 1 to 17, and n is a number from 2 to 6.

2. A substance composition according to claim 1, wherein

R$_1$ is methyl, tert-butyl, tert-amyl, phenyl or chloro,

R$_3$ and R$_4$ are hydrogen,

R$_5$ is a —(CH$_2$)$_n$—N(CH$_3$)$_2$ group, and n is 2 or 3.

3. A pigment composition, which comprises a) 80–99.9 by weight of at least one 1,4-diketopyrrolo[3,4-c]pyrrole pigment, and b) 0.1–20% by weight of a substance composition comprising at least one diketopyrrolopyrrole of each formulae

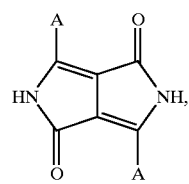 (I)

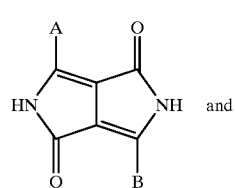 (II)

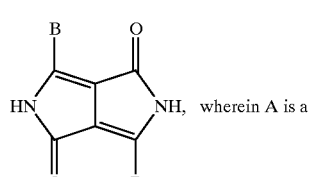 (III)

wherein A is a

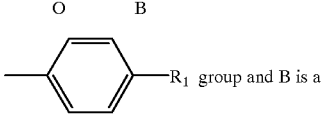 R$_1$ group and B is a

—⟨phenyl⟩—R$_3$ or R$_2$

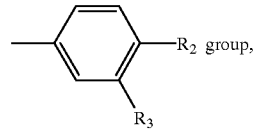 R$_2$ group,

R$_1$ is C$_1$–C$_6$alkyl, C$_1$–C$_6$alkoxy, C$_1$–C$_6$alkylthio, halogen or phenyl, R$_2$ is a carbonyl containing group represented by the formula COX group, wherein X is NR$_4$R$_5$ or a heterocyclic radical containing at least 2 N atoms, one of which N atoms forms an amide with the carbonyl group, R$_3$ is hydrogen, halogen or C$_1$–C$_6$alkyl, R$_4$ is hydrogen, a —(CH$_2$)$_m$—CH$_3$ group, or R$_5$ and R is a —(CH$_2$)$_n$—N(R$_6$)$_2$,

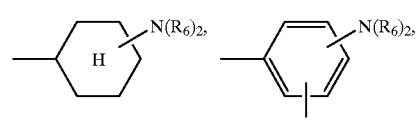

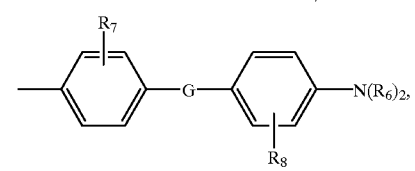

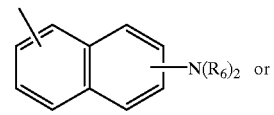 or

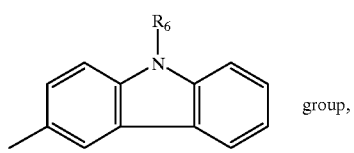 group,

G may be a direct bond, —CH$_2$—, —CH(CH$_3$)—, —C(CH$_3$)$_2$—, —CH=N—, —N=N—, —O—, —S—, —SO—, —SO$_2$— or —NR$_9$—, R$_6$ is C$_1$–C$_6$alkyl, R$_7$ and R$_8$ are each, independently of the other, hydrogen, halogen, C$_1$–C$_6$alkyl, R$_9$ is hydrogen or methyl, m is zero or a number from 1 to 17, and n is a number from 2 to 6, or c) 0.1–20% by weight of a diketopyrrolopyrrole of formula II.

4. A pigment composition according to claim 3, which comprises a) 80–99.9 by weight of at least one 1,4-diketopyrrolo[3,4-c]pyrrole pigment, and b) 0.1–20% by weight of a substance composition comprising at least one diketopyrrolopyrrole of each formulae

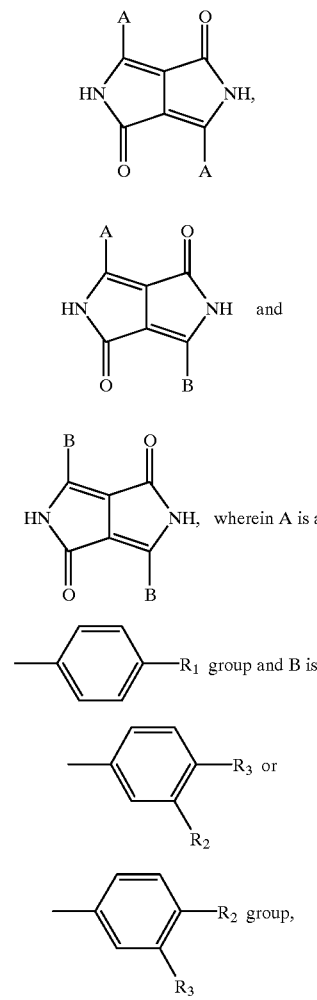

R₁ group and B is a

R₃ or

R₂ group,

- $R_1$ is $C_1$–$C_6$alkyl, $C_1$–$C_6$alkoxy, $C_1$–$C_6$alkylthio, halogen or phenyl,
- $R_2$ is a carbonyl containing group represented by the formula COX group, wherein
- X is $NR_4R_5$ or a heterocyclic radical containing at least 2 N atoms, one of which N atoms forms an amide with the carbonyl group,
- $R_3$ is hydrogen, halogen or $C_1$–$C_6$alkyl,
- $R_4$ is hydrogen, a —(CH₂)ₘ—CH₃ group, or $R_5$ and
- $R_5$ is a —(CH₂)ₙ—N(R₆)₂, G may be a direct bond, —CH₂—, —CH(CH₃)—, —C(CH₃)₂—, —CH=N—, —N=N—, —O—, —S—, —SO—, —SO₂— or —NR₉—, $R_6$ is $C_1$–$C_6$alkyl, $R_7$ and $R_8$ are each, independently of the other, hydrogen, halogen, $C_1$–$C_6$alkyl, $R_9$ is hydrogen or methyl, m is zero or a number from 1 to 17, and n is a number from 2 to 6.

5. A pigment composition according to claim 3, wherein
a) comprises a 1,4-diketopyrrolo[3,4-c]pyrrole pigment of formula wherein $R_{10}$, $R_{11}$, $R_{12}$ and $R_{13}$ are each independently of one another hydrogen, Cl, Br, CH₃, OCH₃, C(CH₃)₃, CN or phenyl.

6. A pigment composition according to claim 3, which comprises a 1,4-diketopyrrolo[3,4-c]pyrrole of formula VII and a substance composition comprising 3 diketopyrrolopyrroles of formulae I, II and III, wherein $R_{11}$ and $R_{13}$ are hydrogen, and $R_{10}$, $R_{12}$ and $R_1$ are identical.

7. A pigment composition according to claim 6, wherein $R_{10}$, $R_{12}$ and $R_1$ are methyl, tert-butyl, tert-amyl, phenyl or chloro.

8. A composition, which comprises a high molecular organic material selected from the group consisting of cellulose ether, -ester, natural resins and synthetic resins and a pigment composition according to claim 3.

9. A process for colouring high molecular weight organic material, comprising incorporating a tinctorially effective amount of a pigment composition according to claim 3 into a high molecular weight organic material selected from the group consisting of cellulose ether, -ester, natural resins and synthetic resins.

* * * * *